United States Patent [19]

Brunner

[11] 4,005,051

[45] Jan. 25, 1977

[54] WATER-COMPATIBLE SOLVENTS FOR FILM-FORMING RESINS AND RESIN SOLUTIONS MADE THEREWITH

[76] Inventor: Josef Klemens Brunner, Scheuchzerstrasse 47, Zurich, Switzerland

[22] Filed: Nov. 4, 1974

[21] Appl. No.: 520,901

[30] Foreign Application Priority Data

Nov. 5, 1973 Austria .............................. 9267/73

[52] U.S. Cl. .......................... 260/29.4 R; 106/311; 260/29.6 H; 260/29.6 E; 260/29.6 ME; 260/31.4 R; 260/31.8 G

[51] Int. Cl.$^2$ ..................... C09D 3/40; C09D 3/48; B01F 1/00

[58] Field of Search ........... 252/364; 260/29.6 ME, 260/29.6 E, 31.8 G, 31.8 C, 29.2 R, 29.4 R; 106/311, 236, 238

[56] References Cited

UNITED STATES PATENTS

| 3,106,486 | 10/1963 | Harren et al. | 260/29.6 ME |
|---|---|---|---|
| 3,150,110 | 10/1964 | Becker et al. | 260/29.6 ME |
| 3,223,083 | 12/1965 | Cobey | 260/78.4 N X |
| 3,312,652 | 4/1967 | Coney et al. | 260/29.6 ME |
| 3,723,379 | 3/1973 | Althouse et al. | 260/31.8 G |
| 3,746,725 | 7/1973 | Eilers et al. | 260/29.6 E |

OTHER PUBLICATIONS

"Encyclopedia of Polymer Science and Technology" John Wiley and Sons, Inc. (1969) vol. 10, p. 247.

*Primary Examiner*—Richard D. Lovering
*Assistant Examiner*—David Leland
*Attorney, Agent, or Firm*—William R. Woodward

[57] ABSTRACT

The dimethyl ethers of succinic, glutaric and adipic acids show a great increase in their water miscibility when they are mixed with either 6-hydroxycaproic acid methyl ester, one or more of the glycol ethers, diglycol ethers and glycol ether acetates, or both 6-hydroxycaproic acid methyl ester and one or more of the glycol ethers, diglycol ethers and glycol ether acetates. These dimethyl esters are, accordingly, substituents for the glycol ether derivatives in water-miscible solvents for film-forming resins. They may provide up to 80% by weight of the non-water components of the solvent. They may be produced at the same time as the methyl ester of 6-hydroxycaproic acid in a single esterification step by esterifying a fraction of acids derived from the waste salt solutions of cyclohexanone manufacture, as described in a related application, Ser. No. 372,021, now U.S. Pat. No. 3,859,335.

5 Claims, No Drawings

WATER-COMPATIBLE SOLVENTS FOR FILM-FORMING RESINS AND RESIN SOLUTIONS MADE THEREWITH

This invention relates to extensively watermiscible solvents for film-forming compositions such as lacquers, varnishes, paints and the like, and film-forming compositions comprising such solvents.

In the finish-coating industry, solutions of various synthetic resins are manufactured on a large scale in a wide variety. If the common solvents are used in these manufactured products, for example the lower molecular weight esters, ketones, terpenes and alcohols, several undesirable properties are attached to the resulting products: so long as there is a considerable solvent content, the film-forming compositions are inherently combustible; in the drying of an applied coating of the film-forming composition, solvent vapors are given off that, on the one hand, are dangerous from the point of view of fires and explosions and, on the other hand, involve a health risk for the personnel involved in applying these coatings and dealing with or approaching the coated articles during the drying process.

It has therefore been sought to avoid in whole or in part the use of the common solvents and the so-called water-thinnable paints and other finishes have been developed which contain water instead of organic solvents. These include both dispersions (e.g. polyvinyl acetate dispersions) and also true solutions (e.g. solutions of melamine-formaldehyde resins). For these products also, however, additions of organic materials are needed in order, on the one hand, to improve the utilization qualities of the finishes (e.g. flowing qualities in brush or roller application, viscosity, film-forming temperature, etc.) and, on the other hand, to increase the solubility of the resins. The ability to take up a considerable water content, in other words a considerable water miscibility, is required of these organic additions, since the products must be capable of being thinned with water.

The technical practice in this regard is to utilize primarily the lower alkyl monoethers of ethylene glycol and of diethylene glycol (the latter being an internal ether sometimes known as "diglycol") and their acetates, hence particularly methyl, ethyl and butyl glycol ethers, methyl, ethyl and butyl diglycol ethers and the acetates of methyl, ethyl and butyl glycol ethers. The boiling points of these compounds lie in the region between 122° and 230° C. The toxicity of these materials, particularly in the case of the lower boiling glycol ethers, however, is a disadvantage that restricts the applicability of these solvents. Thus, the maximum permissible concentration of vapors at a work site has been set at 80 mg per cubic meter of air for ethylene glycol monomethyl ether (commonly called "methyl glycol ether"), at 120 mg/m$^3$ for methyl glycol acetate (more accurately called "methoxyethyl acetate") and at 240 mg/m$^3$ for butyl glycol ether. These low values discourage the incorporation of these products in finishes for use indoors. The butyl ester of glycolic acid, which has a boiling point at about 190° C at a pressure of 1 atm. is also often used as a solvent. This compound can take up a maximum of 25% of water and has a maximum solubility in water of 8%.

It has been surprisingly found by the present invention that mixtures of the methyl esters of the aliphatic dicarboxylic acids in which the acid group has from four to six carbon atoms are substituents that in many cases may replace the glycol ethers in whole or in part in solvents and finishes. This is true primarily of the dimethyl esters, but a considerable admixture of the corresponding monomethyl esters, which may be present, for example, as the result of incomplete esterification, does not impair the solvent and water miscibility properties of the material. The straight-chain acids involved are, of course, succinic, glutaric and adipic acids.

The methyl esters of the dicarboxylic $C_4$ to $C_6$ acids, however, have only a very small capability of taking up water. If the methyl esters of the dicarboxylic $C_4$ to $C_6$ acids are used mixed with glycol ethers, or with the methyl ester of 6-hydroxycaproic acid (sometimes known as ehydroxycaproic acid), or with both glycol ethers and 6-hydroxycaproic acid, it is possible to increase sharply the water miscibility. According to the ratio of the dicarboxylic acid esters to the glycol ethers or to the hydroxy acid ester, the capability of taking up water can be increased up to more than 30% by weight.

EXAMPLE 1

A mixture of succinic acid dimethyl ester and 6-hydroxycaproic acid methyl ester in equal proportions by weight is prepared. Water is then added to the mixture. Up to 30% of water can be added and taken up by the mixture without separation of a water phase.

EXAMPLE 2

The dimethyl ester of glutaric acid is mixed in equal proportions by weight with 6-hydroxycaproic acid methyl ester and water is added to the mixture. Miscibility of the water is found up to about 25% water content by weight.

EXAMPLE 3

The dimethyl ester of adipic acid is mixed with 6-hydroxycaproic methyl ester in equal proportions by weight. Water is then added progressively to the mixture. Miscibility of the water is found up to 18% water content by weight.

EXAMPLE 4

A mixture is made of 67% by weight of 6-hydroxycaproic methyl ester and 33% by weight of the dimethyl ester of adipic acid. Water is then added. Miscibility of all of the water is found to almost 30% by weight water content.

It is clear that the mixtures of Examples 1, 2 and 4 are fully as valuable for their ability to take up water as the butyl ester of glycolic acid.

In the mixtures above described, the esters of the three dicarboxylic acids can be fully substituted one for the other. In order to provide a more even rate of vaporization over the drying period of a finish, however, it is more practical to use mixtures of any two or of all three of these esters.

6-Hydroxycaproic acid ester and also the higher molecular weight glycol ethers and glycol ether acetates have the least volatility, so that they vaporize last out of a drying film-forming composition. Thus, even during the drying process, there is no danger of the separating out of a water phase or of a whitening of the film.

The esters of the dicarboxylic acids and of the hydroxy acids are less harmful to human health than the glycol ethers, if only on account of their lower volatility. There are, therefore, no serious reservations against their use in finishes for indoor use.

The production of the solvent mixtures of the present invention can be carried out by simply mixing the individual components. When 6-hydroxycaproic acid methyl ester is used, however, it is particularly useful to start from a mixture of the corresponding dicarboxylic acids with 6-hydroxycaproic acid, such as the product of the treatment of the waste salt solutions of cyclohexanone manufacture described in the copending patent application, in which one of the inventors is the present inventor, filed June 21, 1973, Ser. No. 372,021, now U.S. Pat. No. 3,859,335, and then to esterify both the hydroxy acid and the dicarboxylic acids at the same time. In this manner, a particularly economical manufacturing process is provided and the product is fully competitive with the glycol ethers.

The methyl esters of $C_4$ to $C_6$ dicarboxylic acids according to the present invention may constitute up to 80% by weight of the solvent of the present invention for use in water-thinnable film-forming compositions, the percentage by weight referring to the organic materials apart from any water content.

The glycol derivative portion of the solvents of the present invention may, of course, also, contain some of the butyl ester of glycolic acid, although it is more practical to use the dimethyl esters of the above-mentioned $C_4$ to $C_6$ acids for the higher boiling components and to use glycol derivatives mainly for the low-boiling components.

I claim:
1. A water-miscible film-forming composition in the liquid state comprising one or more film-forming resins dissolved in a solvent, which solvent consists essentially, apart from any water content, of between 0.5 and 80% of at least one dimethyl ester of an aliphatic dicarboxylic acid which acid contains not less than four nor more than six carbon atoms, with the remainder of the non-water component or components of said solvent consisting of the methyl ester of 6-hydroxycaproic acid and at least one substance selected from the group consisting of monomethyl, monoethyl and monobutyl ethers of ethylene glycol, monomethyl, monoethyl and monobutyl ethers of diethylene glycol, and acetates of the aforesaid ethers of ethylene glycol and of diethylene glycol.

2. An extensively water-miscible solvent for film-forming resins consisting essentially, apart from any water content of said solvent, of between 0.5% and 80% of at least one dimethyl ester of an aliphatic dicarboxylic acid which acid contains not less than four nor more than six carbon atoms, and a quantity of the methyl ester of 6-hydroxycaproic acid present in a proportion relative to the dicarboxylic acid ester content that is in the range from 1:1 to 2:1, with the remainder of the non-water component or components of said solvent consisting of at least one substance selected from the group consisting of monomethyl, monoethyl and monobutyl ethers of ethylene glycol, monomethyl and monobutyl ethers of diethylene glycol, and acetates of the aforesaid ethers of ethylene glycol and of diethylene glycol.

3. A solvent as defined in claim 2, in which the dicarboxylic acid ester content includes esters of at least two of said dicarboxylic acids.

4. A solvent as defined in claim 2, in which the dicarboxylic acid ester content includes esters of all three straight-chain $C_4$ to $C_6$ dicarboxylic acid.

5. A water-miscible film-forming composition in the liquid state comprising one or more film-forming resins dissolved in a solvent, which solvent consists essentially, apart from any water content, of between 0.5 and 80% of at least one dimethyl ester of an aliphatic dicarboxylic acid which acid contains not less than four nor more than six carbon atoms, with the remainder of the non-water component or components of said solvent consisting of the methyl ester of 6-hydroxycaproic acid.

* * * * *